March 15, 1966      D. E. VARNER      3,240,939
MEASUREMENT OF ELECTRIC AND MAGNETIC FIELDS BY
BACKSCATTERING OF NUCLEAR RADIATION PARTICLES
Filed May 5, 1961

INVENTOR
Donald E. Varner
By Anthony D. Cimmino
ATTORNEY

United States Patent Office 3,240,939
    Patented Mar. 15, 1966

3,240,939
MEASUREMENT OF ELECTRIC AND MAGNETIC FIELDS BY BACKSCATTERING OF NUCLEAR RADIATION PARTICLES
Donald E. Varner, Columbus, Ohio, assignor to Industrial Nucleonics Corporation, a corporation of Ohio
Filed May 5, 1961, Ser. No. 108,108
11 Claims. (Cl. 250—83.3)

This invention pertains generally to the measurement of the strength of a magnetic or an electric field and more particularly to measuring apparatus in which the strength of a field being measured controls the number of radioactive particles passing between a radioactive source and a radiation detector so that a signal proportional to the strength of the field being measured is produced by the radiation detector.

In the past, several different types of instruments have been developed to measure the strength of a magnetic field. For example, devices based on the well-known Hall effect in a semiconductor material provide adequate means for measuring the strength of a magnetic field. However, if satisfactory results are to be obtained with such devices great care must be exercised since other phenomena, as the effect of ambient temperature on the operation of semiconductor device, may mask the effects of a magnetic field being measured. Further, it has been found in practice that the size of the magnetic field which may be measured by a device based on the Hall effect is very limited.

Other known types of magnetic field measuring devices include those whose operation depend on the principle that an induced electromotive force is generated in an electrical conductor moved through a magnetic field and that the amplitude of such an induced electromotive force may be considered to be a measurement of the strength of a magnetic field. The well-known ballistic galvanometer and moving coil instruments of various types are examples of measuring devices using an induced electromotive force to measure a magnetic field. Although both the ballistic galvanometer and the moving coil instrument have been in use for many years, the basic difficulty attendant upon use of either has never been completely overcome. That is, whether a ballistic galvanometer or a moving coil instrument is used, great care must be taken to make certain that the required sensing coil is moved properly through the magneic field being measured. Otherwise, the electromotive force induced in the sensing coil is not in fact a true measure of the strength of the field.

A relatively new approach to the problem of measuring magnetic field strength is exemplified by the disclosure of U.S. Patent 2,603,687 issued July 15, 1952, to L. J. Giacoletto and entitled "Magnetometer." Patentee contemplates providing an electron beam in an electron discharge tube, the electron beam being continuously subjected to a time-varying electric field and to a steady magnetic field to be measured, whereby the electron beam is periodically directed to an anode. The instantaneous value of the electric field at the time the electron beam is directed to the anode is noted and deemed to be an indication of the strength of the magnetic field being measured.

When it is desired to measure the strength of an electric field, it has been customary in the past to use a high impedance voltmeter, as an electrostatic voltmeter. However, all known voltmeters adapted to the measurement of an electric field are relatively delicate and difficult to use. Therefore, such devices are not too well adapted to conditions ordinarily encountered in field use, as in a factory, unless a close check is kept over operation and instrument calibration.

It is, accordingly, a primary object of this invention to provide apparatus for measuring either a magnetic field or an electric field.

A further object of this invention is to provide apparatus for measuring a magnetic or an electric field extending over a large area.

Still another object of this invention is to provide apparatus for measuring a magnetic or an electric field which accurately measures either kind of field and which need not be calibrated at frequent intervals during use.

A still further object of the invention is to provide sturdy and rugged apparatus to be used in diverse environments to measure either magnetic or electric fields.

A still further object of the invention is to provide apparatus for measuring the magnetic properties of a test sample of a material by observing the effect of such a test sample on a known magnetic field.

These and other objects are attained, in accordance with the invention, by providing means for detecting the effect of a field to be measured (whether such field is an electric field or a magnetic field) on beta particles passing between a radioactive source and a radiation detector. The latter two elements are so positioned with respect to each other that, in the absence of a filed to be measured, the beta particles from the radioactive source move almost directly away from the radiation detector. When a field is to be measured, the beta particles moving away from the radiation detector are caused to penetrate into such a field in such a manner that numbers of the beta particles are decelerated and turned back to impinge upon the radiation detector, thereby to produce a signal output proportional to the strength of the field being measured. An amplifying circuit and a recorder actuated thereby may also be provided when it is desired to record the signal output of the radiation detector.

A more complete understanding of the invention will be apparent from the following detailed description taken in conjunction with the accompanying drawings, wherein.

Figure 4:
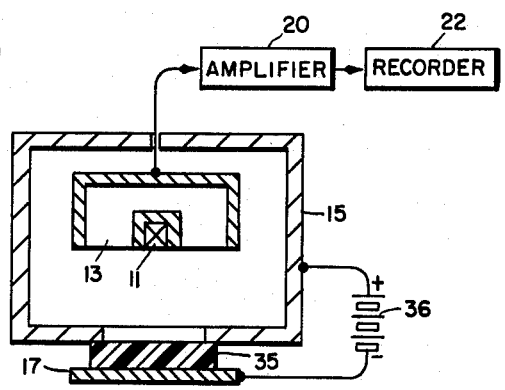
Figure 5:
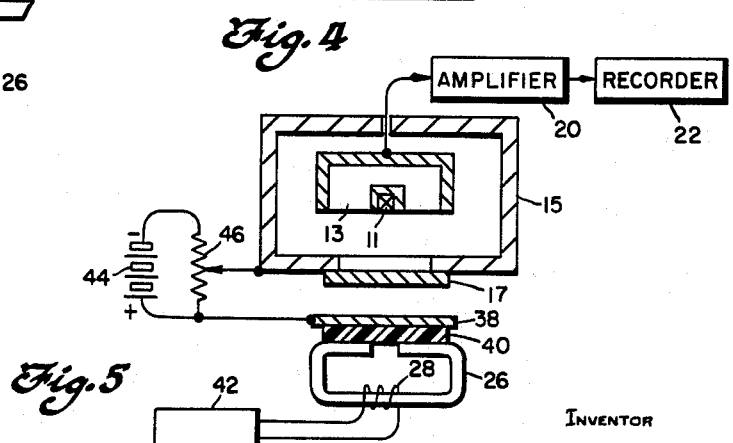

FIG. 4 is a partially block and partially schematic diagram of measuring apparatus according to the invention whereby the strength of an electric field may be measured; and FIG. 5 is a partially block and partially schematic diagram of measuring apparatus according to the invention whereby the combined effect of a steady magnetic and a steady electric field is used to determine the strength of the magnetic field.

Figure 1:
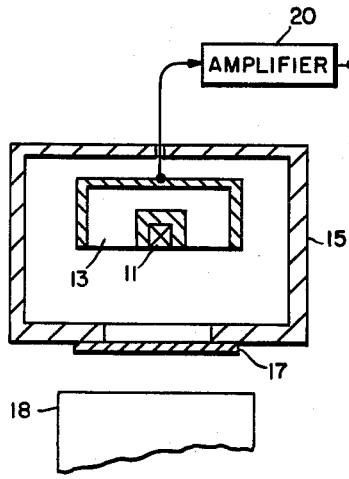
FIG. 1 is a block diagram of measuring apparatus according to the invention whereby the magnetic field strength of a bar magnet may be measured.

The embodiment of measuring apparatus in accordance with the invention shown in FIG. 1 generally comprises means for providing radioactive particles at an average constant rate and means for detecting the number of such particles per unit time impinging upon a radiation detector after reaction with a magnetic field being measured. Thus, a radioactive source 11, which may be a capsule containing krypton 85 if beta particles are to be the particular kind of radioactive particles, and a radiation detector 13 sensitive to beta particles are supported within a radiation shield 15 so that the beta particles emanating from the radioactive source 11 initially are directed away from the radiation detector 13 toward a non-magnetic window 17 in the radiation shield 15. The magnetic field being measured is in the instant case, created by a bar magnet 18 supported outside the radiation shield 15 in any convenient manner so that the magnetic field of the bar magnet 18 penetrates through the non-magnetic window 17 into the space through which the beta particles are projected. As a result, the beta particles from the radioactive source 11 are projected into a magnetic field of ever-increasing strength. Each beta particle, therefore, is subjected to a decelerating force, the instantaneous magnitude of which is dependent upon the instantaneous magnitude of the magnetic field gradient through which each particle passes. At the same time, the trajectory of those beta particles which cut across lines of force in the magnetic field are continuously curved, the exact curvature of each trajectory being dependent upon the contour of the magnetic field being measured and the initial velocity of each beta particle. Thus, the beta particles which do not cut across lines of force are simply decelerated until their initial velocity is lost, at which time they are directed back to the radioactive source 11. However, a portion of those beta particles which cut across the lines of force in the magnetic field being measured and which are recurved by that magnetic field are not directed back to the radioactive source 11, but rather pass beyond the radioactive source 11 to impinge on the face of the radiation detector 13.

It has been found that, if the physical spacing between the elements is fixed and the number of beta particles emitted by the radioactive source 11 per unit time is constant, then the number of beta particles redirected, or "back-scattered," by the magnetic field being measured to impinge on the radiation detector 13 is proportional to the strength of the magnetic field of the bar magnet 18.

Although the type of radiation detector used is not critical to the invention, it is preferred that radiation detector 13 be of the type disclosed in U.S. Patent 2,955,206 to Spergel et al. In a radiation detector of the disclosed type, an electrical signal having an amplitude proportional to the number of radioactive particles, specifically beta particles, impinging thereon is produced. The use of the preferred type of radiation detector therefore results in the production of an electrical signal whose amplitude is proportional to the number of back-scattered beta particles, which number in turn is a function of the strength of the field being measured. The electrical signal output of the radiator detector 13 may then, if desired, be amplified by an amplifier 20 to drive a recorder 22 to provide a permanent record of the strength of the magnetic field being measured.

It will be recognized that the operation of the just described embodiment of the invention is not dependent upon the polarity of the bar magnet 18. That is, either the north pole or the south pole of a magnet may be used to provide the magnetic field to be measured. However, it should be noted that, as a practical matter, it must not be assumed that the two poles of a bar magnet are, except for polarity, identical.

Figure 2:
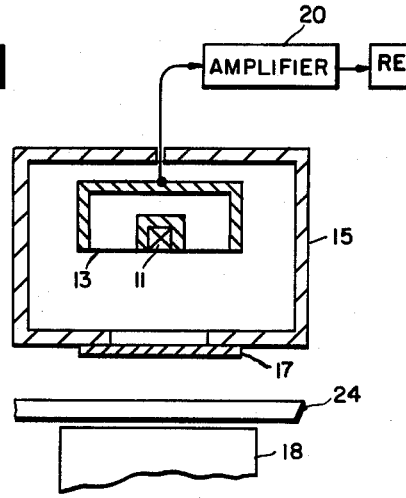
FIG. 2 is a block diagram of measuring apparatus according to the invention whereby magnetic properties of a test sample of a material may be measured by observing the effect of such a sample on a known magnetic field from a bar magnet.

Referring now to FIG. 2, an embodiment of the invention whereby the magnetic properties of a material may be determined as shown. A radioactive source 11, as krypton 85, within a radiation shield 15 emanates beta particles toward a non-magnetic window 17, the beta particles being turned to impinge upon a radiation detector 13 upon reaction with the magnetic field from a bar magnet 18. A test sample 24 of a material to be tested is placed in the magnetic field from the bar magnet 18 so that that magnetic field is modified, thereby to affect the paths of the beta particles. If the test sample 24 is non-magnetic, its presence in the magnetic field will have no recognizable effect on the operation of the apparatus. On the other hand, if the test sample 24 is magnetic, then its presence in the magnetic field of the bar magnet 18 will modify the effect of that magnetic field on the beta particles from the radioactive source 11. On the one hand, if the test sample 24 has no residual magnetism, the strength of the magnetic field of the bar magnet 18 will be increased by an amount dependent on the thickness of the test sample 24 and its permeability thereby increasing the number of beta particles impinging on the radiation detector 13. On the other hand, if there is residual magnetism in the test sample 24, the polarity of such magnetism modifies the effect of the test sample 24 on the field of the bar magnet 18. Thus, let it be assumed that one surface of the test sample 24 is a north pole and the other surface is a south pole, and the pole of the bar magnet 18 being used is a north pole. If the test sample 24 is so oriented that its "north pole" surface is adjacent the north pole of the bar magnet 18, then the strength of the resultant magnetic field operative on the beta particles is a function of the difference between the strength of the magnetic field of the bar magnet 18 and the strength of the magnetic field of the test sample 24. If the test sample 24 is reversed in its orientation to the bar magnet 18, the resultant magnetic field is a function of the sum of the strengths of the two fields.

A change in the strength of the magnetic field through which the beta particles from the radioactive source 11 are projected, all other things being the same, is reflected in a change in number of beta particles turned to impinge upon the radiation detector 13. Therefore, the presence of a test sample 24 of a magnetic material will, since such a sample changes the strength of the magnetic field through which the beta particles are projected, change the number of beta particles impinging on the radiation detector 13, the exact change in the magnetic field being determined by the physical dimensions and magnetic properties of the test sample 24. Consequently, if the physical dimensions of the test sample 24 are kept constant, then changes in the output signal of the radiation detector 13 will be the result only of changes in the magnetic properties of the test sample 24. In practical measuring apparatus, such changes may be observed and recorded by means of a recorder 22 actuated by the radiation detector 13 through an amplifier 20 as described hereinbefore.

Figure 3:
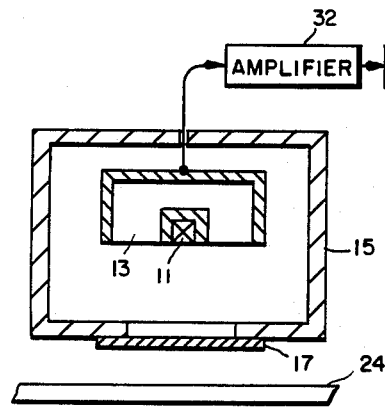
FIG. 3 is a block diagram of measuring apparatus according to the invention whereby the magnetic field strength of a test sample of a material may be measured by observing the effect of such a test sample on the magnetic field adjacent the gap of a horseshoe magnet.

Referring now to FIG. 3 another embodiment of the invention is shown in which measurement of magnetic field strength is accomplished through the reaction between the fringe magnetic field of a horseshoe magnet and beta particles from a radioactive source. In this embodiment, a radioactive source 11 and a radiation detector 13, which may be the same as those used in the previously illustrated embodiments of the invention, are placed in the fringe field across the gap of an electromagnet 26. The field across the gap is created by a coil 28 energized by a current source 30, which current source 30 is a source of alternating current to provide time-varying magnetic field reacting with the beta particles from the radioactive source 11. Consequently time-varying numbers of beta particles are backscattered to the radiation detector 15 to produce a time-varying signal output which may be amplified by an A.C. amplifier 32 and fed into a recorder 34 responsive to an A.C. signal. However, it should be noted that the current source 30 may be a D.C. source if it is desired to use the same type of amplifier and recorder as before.

The average effect of a time-varying field on the back-scattering of beta particles, is, as would be expected, somewhat less than the effect of a steady field. Further, when an electromagnet is used to generate a magnetic field, it must be recognized that self-heating effects in the coil of the electromagnet may cause some drift. Obviously then, if these effects are recognized, it is possible to measure the field strength of an electromagnet energized by an A.C. current, or alternatively to measure the magnetic properties of a test sample 24 placed in the field of an electromagnet.

Referring now to FIG. 4, another embodiment of the invention by means of which the strength of an electric field may be measured is shown. In this embodiment, beta particles emanating from a radioactive source 11 are projected through an electric field of ever-increasing strength. In order that such an electric field be easily created, it is preferred that an insulator 35 be inserted between the non-magnetic window 17 and the radiation shield 13. A voltage source 36 may then be connected between the non-magnetic window 17 and the radiation shield 15, the negative terminal of the voltage source 36 being connected to the window 17. It will be recognized immediately that, although the beta particles move in the present case through an electric field, the effect of such a field on the beta particles is essentially the same as the effect of the magnetic fields considered hereinbefore. That is, the individual beta particles are initially decelerated and the paths of certain ones are curved on passage through the field so that at least a portion of the beta particles, depending on the strength of the electrostatic field and the initial velocity of the beta particles, are backscattered so as to impinge on the radiation detector 13. The number of backscatttered beta particles impinging on the radiation detector 13 in turn determines the amplitude of the electrical signal output therefrom. This signal may be, as before, amplified by an amplifier 20 and recorded on a recorder 22 thereby to produce a visual record of the intensity of the electric field through which the beta particles moved.

Measuring apparatus generally of the type contemplated by the invention wherein beta particles from a radioactive source are subjected simultaneously to an electric field and a magnetic field is shown in FIG. 5. A magnetic field is generated by a current from a D.C. current source 42 through a coil 28 mounted on an electromagnet 26. This field penetrates through an electrical insulating sheet 40, an electrode 38 and a non-magnetic window 17 so as normally to backscatter the beta particles emanating from a radioactive source 11, as previously described. However, a voltage source 44 is connected through a potentiometer 46 across the radiation shield 15 and the electrode 38, the positive terminal of the voltage source 44 being connected to the electrode 38, to establish an electric field which operates to deflect the beta particles oppositely to the magnetic field. By proper adjustment of the potentiometer 46, it is possible to balance the effect of the two fields on the beta particles. When a balance is attained, none of the beta particles are directed to the radiation detector 13, so the output of that element is then minimized. However, if the two fields are not balanced, then a signal output will be amplified by amplifier 20 and recorded by recorder 22.

In the discussion of the various embodiments of the invention, the described effect of a magnetic field or of an electric field of proper polarity on radioactive particles has been sometimes referred to as backscattering as distinguished from simple deflection of such particles. The combination of a radioactive source and a radiation detector disposed so that the radiation detector may be energized only by backscattering of radioactive particles from the radioactive may accordingly be referred to as a backscatter head.

The present invention will be understood to have a wide field of application which is not limited to the specific embodiments herein disclosed. Accordingly, the invention is to be limited only by the scope of the appended claims.

What is claimed is:

1. Apparatus for measuring a magnetic property of a test sample of a material, comprising, a source of beta particles and a radiation detector sequentially disposed in a reference magnetic field, all said beta particles from said source being initially directed away from said radiation detector into said reference magnetic field wherein a first number of said beta particles are backscattered to said radiation detector to produce a reference signal output therefrom proportional in amplitude to said reference magnetic field, means for supporting said test sample in said reference magnetic field to modify said reference magnetic field in accordance with said magnetic property to backscatter a second number of said beta particles to said radiation detector to produce a second signal output therefrom, the difference between said reference signal output and said second signal output being proportional to a magnetic property of the test sample being measured, and means for indicating the amplitude of said reference signal output and said second signal output.

2. Apparatus as in claim 1 wherein said reference magnetic field is time-varying.

3. Apparatus as in claim 1 wherein said radioactive source includes krypton 85.

4. Measuring apparatus wherein a magnetic property of a test sample of a magnetizable material may be determined, comprising a radioactive source of beta particles and a radiation detector, means for directing said beta particles into a reference magnetic field to backscatter a portion of said beta particles to said radiation detector to produce a reference signal output therefrom, means for supporting said test sample to be measured in said reference magnetic field to change the number of beta particles backscattered to said radiation detector to change the signal output thereof in accordance with said magnetic property of said test sample, and means for detecting said change in said signal output of said radiation detector.

5. Apparatus for measuring an electric field, comprising, a radioactive source of charged particles and a radiation detector, means for sequentially supporting said source and said radiation detector initially to direct said particles from said source away from said radiation detector into said electric field to be measured, a portion of said particles being backscattered by said electric field to impinge on said radiation detector and produce a signal output therefrom, and means for recording the amplitude of said signal output.

6. Apparatus as in claim 5 wherein said source of charged particles consists of a capsule of krypton 85.

7. Apparatus for measuring an electric field established by impressing an electric potential between a hollow electrode having an opening formed through one wall thereof and a flat electrode covering said opening and insulated therefrom, comprising, a radioactive source of charged particles and a radiation detector sequentially supported within said hollow electrode initially to direct said particles emitted by said source away from said radiation detector toward said flat electrode, the polarity of said flat electrode being the same as the polarity of said particles to backscatter said particles to said radiation detector to produce a signal output therefrom proportional to the number of particles backscattered by said electric field, and means for recording said signal output.

8. Apparatus for measuring a magnetic field, comprising, means for projecting charged particles emitted by a radioactive source into said magnetic field to cause the paths of a portion of said particles to tend to curve in a first direction, means for simultaneously establishing an electric field coacting with said particles to cause said paths of said portion to tend to curve in a direction opposite to said first direction, radiation detecting means to determine a balance between the effect of said magnetic field and said electric field, and means for adjusting said electric field to attain balance between the effect of said magnetic field and said electric field.

9. Apparatus for measuring a magnetic field, comprising, a source of beta particles and a radiation detector, means for directing all said beta particles from said source into said magnetic field and away from said radiation detector, means establishing an electric field coextensively with said magnetic field, and calibrated means for adjusting said electric field until the number of said beta particles impinging on said radiation detector is minimized.

10. The method of measuring the strength of a magnetic field utilizing a source of beta rays and a radiation detector, which comprises collimating a portion of the rays from said source into a beam directed away from said detector while shielding said detector from the remainder of said rays, maintaining said collimating and shielding relationship while directing said beam into a magnetic field whereby a portion of said beam is backscattered by said field into said detector, and registering the output of said detector produced by said backscattered radiation as the measure of the strength of said field.

11. The method of measuring the strength of an electric field utilizing a source of beta rays and a radiation detector, which comprises collimating a portion of the rays from said source into a beam directed away from said detector while shielding said detector from the remainder of said rays, maintaining said collimating and shielding relationship while directing said beam into said electric field whereby a portion of said beam is backscattered by said field into said detector, and registering the output of said detector produced by said backscattered radiation as the measure of the strength of said field.

References Cited by the Examiner
UNITED STATES PATENTS

| | | | |
|---|---|---|---|
| 2,246,259 | 6/1941 | Machts | 324—44 X |
| 2,383,757 | 8/1945 | Ziebolz | 324—44 X |
| 2,847,581 | 8/1958 | Clark | 250—105 X |
| 2,964,631 | 12/1960 | Foster | 250—83.3 |

RALPH G. NILSON, *Primary Examiner.*

ARTHUR GAUSS, ARCHIE BORCHELT, *Examiners.*